United States Patent [19]

Rose, Jr. et al.

[11] Patent Number: 5,238,100
[45] Date of Patent: Aug. 24, 1993

[54] METHOD AND APPARATUS FOR HANDLING GLASS SHEETS

[75] Inventors: Malcolm F. Rose, Jr., Nashville; Charles B. Tyree, Jr., Mt. Juliet; James D. Dodson; Terry L. Bennett, both of Nashville, all of Tenn.

[73] Assignee: Ford Motor Company, Dearborn, Mich.

[21] Appl. No.: 714,960

[22] Filed: Jun. 13, 1991

[51] Int. Cl.⁵ .............................................. B65G 47/34
[52] U.S. Cl. .................................. 198/468.6; 198/614
[58] Field of Search .................... 198/468.6, 457, 614; 414/749, 750

[56] References Cited

U.S. PATENT DOCUMENTS

| | | | |
|---|---|---|---|
| 2,874,650 | 2/1959 | Royer | 198/468.6 |
| 3,104,004 | 9/1963 | Poel et al. | 198/457 |
| 4,010,843 | 3/1977 | Lucas. | |
| 4,044,901 | 8/1977 | Tokuno | 198/468.6 |
| 4,205,744 | 6/1980 | Timmons et al. | |
| 4,615,431 | 10/1986 | Lisec | 198/468.6 |

Primary Examiner—Joseph E. Valenza
Attorney, Agent, or Firm—C. H. Ellerbrock; C. L. Sadler

[57] ABSTRACT

A method and apparatus for transferring glass sheets from a first roller conveyor to a perpendicularly oriented second roller conveyor utilize a plurality of parallel, spaced-apart lifting arms to lift the glass sheet from the first roller conveyor and deposit same on a belt conveyor for subsequent transport to the second roller conveyor.

7 Claims, 2 Drawing Sheets

METHOD AND APPARATUS FOR HANDLING GLASS SHEETS

FIELD OF THE INVENTION

This invention relates generally to a method and apparatus for handling glass sheets, and more particularly, to a method and apparatus for transferring glass sheets from a first roller conveyor to a second roller conveyor lying perpendicular to the first roller conveyor.

BACKGROUND OF THE INVENTION

Glass for manufacturing automotive and architectural glazings is generally produced by the well-known float glass process. The continuous float glass ribbon so produced is cut into glass sheets of various sizes which are thereafter conveyed to fabrication facilities where the glass sheets are subjected to further processing such as, for example, painting, coating, bending, tempering, annealing, etc.

Roller conveyors conveniently are used in the glass industry for conveying glass sheets from one processing location to another. It is well-known to employ a plurality of conveyors, in the form of a main-line conveyor and a series of spur-line conveyors which lie perpendicular to the main-line conveyor, for sorting the glass sheets and for removing a particular glass sheet from a main-line roller conveyor and selectively conveying it to a particular location via a spur-line roller conveyor. The difficulty in transferring a glass sheet from a first roller conveyor to a second roller conveyor lying perpendicular to the first roller conveyor results from the fact that the axes of the rollers of the first conveyor are perpendicular to the axes of the rollers of the second conveyor.

In the glass industry, it is well-known to transfer sheets of glass from one roller conveyor to another perpendicularly oriented roller conveyor using a perforated vacuum platen. Air is evacuated from the top-side of the platen utilizing conventional vacuum equipment and associated piping. The evacuated platen is superposed above the glass sheet which has come to rest on the first roller conveyor, lowered to contact the glass sheet, and the glass sheet thereby is lifted by engagement with the bottom surface of the platen. The platen, having the glass sheet adhered thereto, is lifted away from the first conveyor, translated in a direction generally parallel to the axes of the rollers of the first roller conveyor to a position above the rollers of the second roller conveyor, and lowered so as to deposit the glass sheet upon the rollers of the second conveyor. The vacuum is reduced and the platen is removed from engagement with the glass sheet.

Use of a perforated vacuum platen tends to mar the surface of the glass, and requires a large amount of energy to operate. Additionally, the complexity of such a system requires a great deal of maintenance, resulting in extended periods of time during which glass sheets cannot be transferred to those spur-line roller conveyors served by the broken-down vacuum platen system.

U.S. Pat. No. 4,205,755 to Timmons et al. discloses a device for transferring a glass sheet from one conveyor to a parallel conveyor, comprising a pivioting glass handling member which additionally turns the glass sheet over as it is being transferred from the first to the second conveyor. Such a device, however, would not be useful for transferring a glass sheet from one roller conveyor to a perpendicularly oriented roller conveyor.

U.S. Pat. No. 4,010,843 to Lucas discloses a device for transferring a load from the end of a first conveyor to a second perpendicularly oriented conveyor. The device comprises lifting elements which are disposed intermediate adjacent rollers of the second conveyor. These elements are lifted to project above the rollers of the second conveyor and lift the leading edge of the load at the end of the first conveyor. The lifting elements are then moved in a direction away from the first conveyor thereby dragging the load axially over the rollers of the second conveyor. When the load is transferred to the second conveyor, the lifting elements are lowered allowing the full weight of the load to rest upon the rollers of the second conveyor. Such an apparatus is only usable, however, for transferring a load to a second conveyor from the end of a first conveyor. It could not be used to transfer a load from any location along a main-line roller conveyor to a perpendicularly oriented spur-line roller conveyor. Furthermore, the process of dragging the load across the rollers of the second conveyor would mar the surface of certain types of conveyed articles such as, for example, glass sheets.

It would be desirable to devise a method and apparatus for transferring glass sheets from any location along a main-line roller conveyor to a spur-line roller conveyor lying perpendicular to the main-line conveyor, without the use of a perforated vacuum platen. Such a device conveniently would not abrade the surfaces of the glass sheets.

SUMMARY OF THE INVENTION

Accordant with the present invention, a method for transferring a glass sheet from a selected location along a first roller conveyor to a second roller conveyor lying perpendicular to the first roller conveyor, has surprisingly been discovered. The method comprises the steps of:

A) raising the glass sheet by means of a plurality of parallel, spaced-apart lifting arms which engage a major surface of the glass sheet and lift the glass sheet to a first position above the first roller conveyor;

B) moving the lifting arms having the glass sheet supported thereon to a second position above a belt conveyor comprising a plurality of parallel, spaced-apart belts;

C) depositing the glass sheet onto the belt conveyor, by the downward movement of the lifting arms to a third position below the belt conveyor; and D) conveying the glass sheet, by means of the belt conveyor, to the second roller conveyor.

The inventive method may be practiced while the first roller conveyor and belt conveyor are each, independently either operating or stationary.

Moreover, the invention contemplates apparatus for transferring a glass sheet from a first roller conveyor to a perpendicularly oriented second roller conveyor. The apparatus comprises:

A) a belt conveyor positioned intermediate the first and second roller conveyors, said belt conveyor comprising a plurality of parallel, spaced-apart belts lying parallel to the longitudinal axis of the second roller conveyor;

B) a plurality of parallel, spaced-apart lifting arms;

C) means for moving the lifting arms from below the first roller conveyor to a first position above the first roller conveyor, thence to a second position above the belt conveyor, thence to a third position below the belt conveyor, thereby engaging a major surface of the glass sheet, lifting the glass sheet from the first roller conveyor and depositing same onto the belt conveyor; and D) means for activating the belt conveyor, to transfer the glass sheet from the belt conveyor to the second roller conveyor.

The inventive apparatus may include a scratch-resistant covering on the lifting arms. Also, the inventive apparatus has the same operability and utility whether the conveying surfaces of the first roller conveyor and belt conveyor are at the same or different elevations.

The present invention is particularly well suited for sorting and routing various sized glass sheets in an automotive or architectural glazings fabrication facility.

BRIEF DESCRIPTION OF THE DRAWINGS

The novel features that are considered characteristics of the invention are set forth with particularity in the appended claims. The invention will be best understood, however, by reference to the accompanying description of specific embodiments when read in connection with the attendant Figures in which:

DETAILED DESCRIPTION OF THE PREFERRED EMBODIMENT

The present invention is directed to a method and apparatus for transferring glass sheets from a first roller conveyor to a second roller conveyor lying perpendicular to the first roller conveyor. Typically, such a method and apparatus is useful for sorting and distributing various sized glass sheets in an automotive or architectural glazings fabrication facility, where several of the inventive devices may be employed to transfer glass sheets from a main-line conveyor to a number of spur-line conveyors lying perpendicular to the main-line conveyor.

Figure 1:
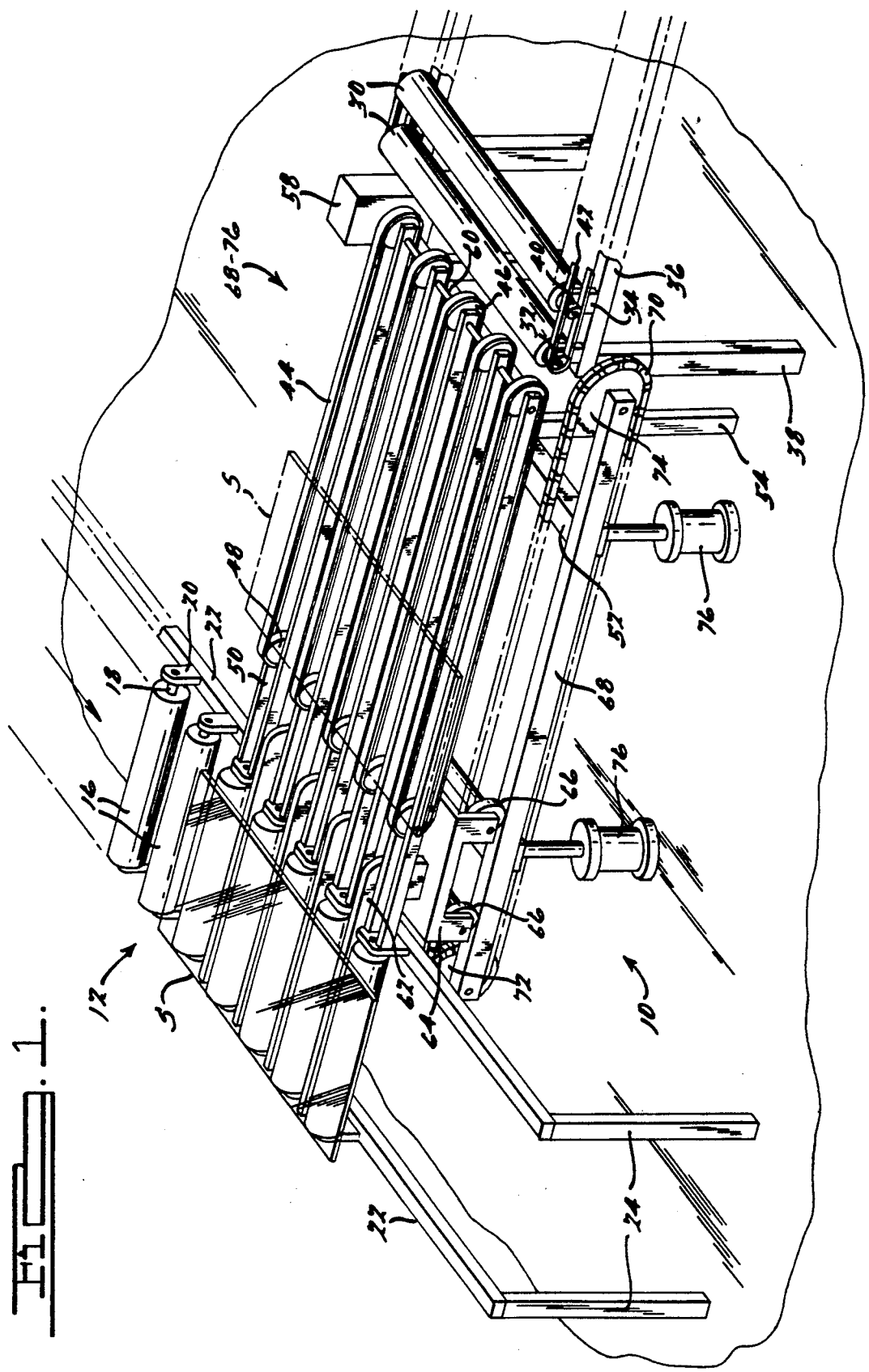
FIG. 1 is a schematic, perspective view of apparatus for transferring a glass sheet from a first roller conveyor to a second, perpendicularly oriented roller conveyor, embodying the features of the present invention.
Figure 2:
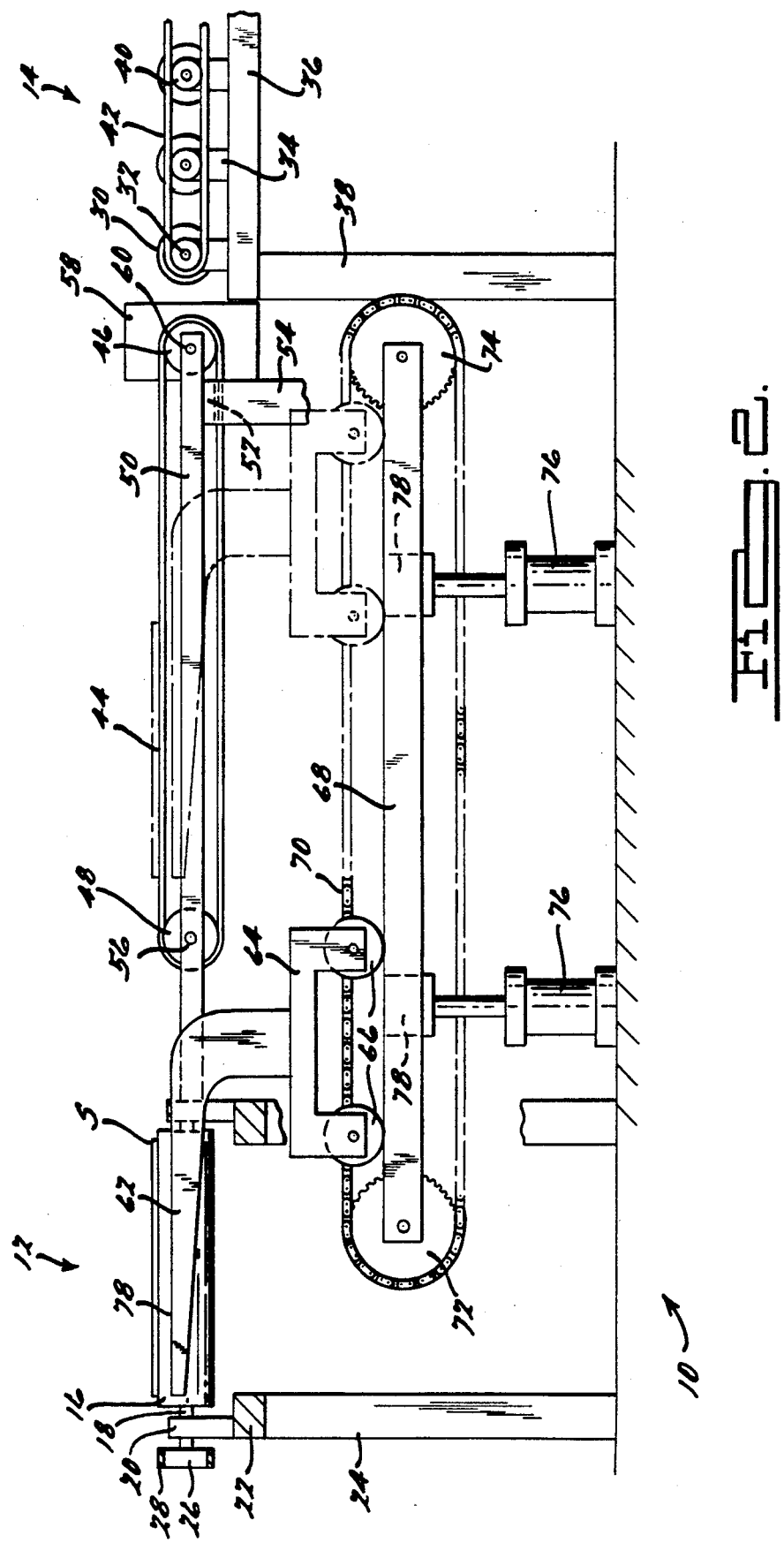
FIG. 2 is a schematic, side elevational view of the apparatus of FIG. 1

Referring now to the drawings, there is shown generally at 10 in FIGS. 1 and 2 apparatus for transferring glass sheets from a first roller conveyor 12 to a second roller conveyor 14 lying perpendicular to the first roller conveyor 12. The first conveyor 12 comprises a plurality of rollers 16 freely rotatable on shafts 18 journally mounted in upstanding bearing housings 20 connected to support rails 22 mounted on stanchions 24. The rollers 16 may be intermittently or continuously rotated in unison by means of drive sprockets 26 mounted on the shafts 18 and a chain 28 driven by conventional drive means (not shown) such as a variable-speed electric motor coupled to an appropriate gear reducer and sprocket. Likewise, the second conveyor 14 comprises a plurality of rollers 30, shafts 32, upstanding bearing housings 34, support rails 36, stanchions 38, drive sprockets 40, a chain 42, and conventional drive means (not shown), which are interconnected and operate in the same manner as the first roller conveyor 12. By the term "perpendicular," when referring to the orientation between the first and second roller conveyors 12 and 14, is meant that the longitudinal axes of the "conveying surfaces," i.e., the bounded plane defined by the apogean generatricies of the cylindrical surfaces of the rollers of either conveyor, are perpendicular. As will be apparent to one ordinarily skilled in the art, the first and second roller conveyors 12 and 14 may optionally be constructed in such a fashion that less than all of the rollers are driven.

A belt conveyor, positioned intermediate the first and second roller conveyors 12 and 14, comprises a plurality of parallel, spaced-apart belts 44 extending between drive pulleys 46 and idler pulleys 48 mounted on channels 50. The channels 50 are individually connected at one end to the upstanding bearing housings 20 of the first roller conveyor and affixed at their opposite ends to a cross-beam 52 mounted on stanchions 54. The drive and idler pulleys 46 and 48 are positioned in vertical slots in the square-cross- sectional channels 50. The idler pulleys 48 freely rotate on individual spindles 56, while the drive pulleys 46 may be intermittently or continuously rotated in unison by conventional drive means such as, for example, a variable-speed electric motor and associated gear reducer 58, connected to a common shaft 60 passing through and affixed to each of the drive pulleys 46. The space between the individual adjacent channels 50 is approximately equal to the space between individual adjacent rollers 16 of the first roller conveyor 12.

A plurality of parallel, spaced-apart lifting arms 62 are affixed to a moveable carriage 64. The lifting arms 62 are oriented parallel to, and generally are positioned intermediate, the belt conveyor channels 50 and associated first conveyor rollers 16. Wheels 66 are rotatably mounted on the carriage 64, thereby allowing the carriage 64 to be urged along carriage support rails 68 by an attached drive chain extending between idler sprockets 72 and drive sprockets 74 journally mounted at opposite ends of the support rails 68. The drive sprockets 74 are connected to conventional drive means (not shown) such as a reversible, variable-speed electric motor and assocaited gear reducer, thereby allowing the lifting arms 62 to be translated back and forth between positions generally intermediate adjacent rollers 16 of the first conveyor 12 (as shown by solid lines in FIG. 2) and intermediate adjacent belts 44 of the belt conveyor (illustrated by broken lines in FIG. 2).

Means are provided for elevating and lowering the lifting arms 62 such as, for example, a plurality of pneumatic or hydraulic cylinders 76 affixed to support beams 78 extending between the support rails 68. The cylinders 76 may be actuated to elevate or lower the lifting arms 62 to positions above and below the conveying surface of the first roller conveyor 12, and to positions above and below the conveying surface of the belt conveyor (i.e., the bounded plane defined by the upwardly-facing surfaces of the belts 44).

Briefly reviewing the operation of the apparatus 10 embodying the features of the present invention illustrated in FIGS. 1 and 2, a glass sheet S is conveyed along the first roller conveyor 12, to a position whereat the glass sheet S is to be removed and transferred to the second roller conveyor 14 lying perpendicular to the first roller conveyor 12. Glass sheets S are urged along the first conveyor 12 by uniformly rotating at least a portion the rollers 16 by means of the associated drive sprockets 26 and drive chain 28. The drive chain 28 is driven by conventional drive means, as described hereinabove. The rollers 16 may be rotating as the glass sheet S is removed from the roller conveyor 12, or the conveyor drive means may be stopped and the glass sheet S may be stationary on the rollers 16 as it is removed from the conveyor 12.

The lifting arms 62 located below the first roller conveyor 12 are raised to a first position above the first roller conveyor 12 by actuating the cylinders 76, to engage and lift the glass sheet S from the conveyor 12. By the terms "above" and "below," as used herein to describe the position of the lifting arms 62 in relation to any of the conveyors, is meant that the lifting arms 62 are either above or below the conveying surfaces of the conveyors, as defined hereinabove. The glass-engaging surfaces 78 may be merely the exposed surfaces of the lifting arms 62, or may comprise a scratch-reducing material adhered to the lifting arms 62 such as, for example, strips of felt, neoprene, EPDM rubber, plastic, etc. Due to the cantilevered configuration of the lifting arms 62, it is possible, and in most cases desirable, to raise the lifting arms 62 to an elevation above the conveying surface of the first roller conveyor 12 that glass sheets S which are not to be transferred to the second roller conveyor 14 may pass beneath the lifting arms 62 and be conveyed further along the first roller conveyor 12. This may be achieved by raising the supprt arms 62 above the first roller conveyor 12 a distance greater than the thickness of the glass sheets being conveyed on the first roller conveyor 12.

The lifting arms 62, having the glass sheet S, which is to be transferred to the second conveyor 14 supported thereon, are then moved from the first position to a second position above the belt conveyor. This is accomplished by urging the carriage 64 along the support rails 68 by means of the associated drive chain 70. As illustrated in FIG. 2, the conveying surfaces of the first roller conveyor 12 and the belt conveyor are at the same elevation. However, the present invention also contemplates the situation where these conveying surfaces are at different elevations.

Next, the lifting arms 62 are lowered from the second position to a third position below the belt conveyor. The downward movement of the lifting arms 62 causes the glass sheet S to be deposited onto the belt conveyor. At the time of such deposition, the belts 44 may be moving or stationary. After the lifting arms 62 have reached the third position below the belt conveyor, they may thereafter be reintroduced below the first roller conveyor 12 for lifting and supporting a subsequent glass sheet S.

Finally, in the case where the belts 44 are stationary when the glass sheet S is deposited thereon, the belt conveyor is then activated to transport the glass sheet S to the second roller conveyor 14. By the term "activated" is meant that the belts 44 are uniformly set in motion to convey the glass sheet S toward the second roller conveyor 14. This may be accomplished by energizing the drive means 58, which rotates the belt conveyor drive pulleys 46 via the associated common shaft 60. The second roller conveyor 14 accepts the glass sheet S from the belt conveyor and conveys same along the conveyor 14 in the same manner of operation as described for the first conveyor 12.

The present invention represents a significant advance in the manner and speed with which glass sheets may be transferred from one roller conveyor to a perpendicularly oriented roller conveyor. Specifically, the inventin has been demonstrated at eight cycles per minutel which is significantly faster than transfer by a vacuum platen.

While certain representative embodiments and details have been shown for the purpose of illustrating the present invention, it will be apparent to those ordinarily skilled in the art that various changes in applications can be made therein, and that the invention may be practiced otherwise than as specifically illustrated and described without departing from its spirit and scope.

We claim:

1. A process for transferring a glass sheet from a first roller conveyor to a second roller conveyor lying perpendicular to the first roller conveyor, comprising the steps of:
   A) raising the glass sheet by means of a plurality of parallel, spaced-apart lifting arms which engage a major surface of the glass sheet, and lift the glass sheet to a first position above the first roller conveyor;
   B) moving the lifting arms having the glass sheet supported thereon to a second position above a belt conveyor comprising a plurality of parallel, spaced-apart belts;
   C) depositing the glass sheet onto the belt conveyor, by the downward movement of the lifting arms to a third position below the belt conveyor; and
   D) conveying the glass sheet, by means of the belt conveyor, to the second roller conveyor.

2. The process for transferring a glass sheet from a first roller conveyor to a second roller conveyor lying perpendicular to the first roller conveyor according to claim 1, wherein, at the first position, the lifting arms are positioned above the first roller conveyor a distance greater than the thickness of the glass sheets being conveyed as the first roller conveyor.

3. The process for transferring a glass sheet from a first roller conveyor to a second roller conveyor lying perpendicular to the first roller conveyor according to claim 1, wherein the glass sheet is stationary on the first roller conveyor when it is raised therefrom by the lifting arms.

4. The process for transferring a glass sheet from a first roller conveyor to a second roller conveyor lying perpendicular to the first roller conveyor according to claim 1, wherein the belts of the belt conveyor are stationary when the glass sheet is deposited thereon.

5. Apparatus for transferring a glass sheet from a first roller conveyor to a second roller conveyor lying perpendicular to the first roller conveyor, comprising:
   A) a belt conveyor positioned intermediate the first and second roller conveyors, said belt conveyor comprising a plurality of parallel, spaced-apart belts lying parallel to the longitudinal axis of the second roller conveyor;
   B) a plurality of parallel, spaced-apart lifting arms;
   C) means for moving the lifting arms from below the first roller conveyor to a first position above the first roller conveyor, thence to a second position above the belt conveyor, thence to a third position below the belt conveyor, thereby engaging a major surface of the glass sheet lifting the glass sheet from the first roller conveyor and depositing same onto the belt conveyor; and
   D) means for activating the belt conveyor, to transfer the glass sheet from the belt conveyor to the second roller conveyor.

6. Apparatus for transferring a glass sheet from a first roller conveyor to a second roller conveyor lying perpendicular to the first roller conveyor according to claim 5, wherein at the first position the lifting arms are positioned above the first roller conveyor a distance greater than the thickness of the glass sheets being conveyed on the first roller conveyor.

7. Apparatus for transferring a glass sheet from a first roller conveyor to a second roller conveyor lying perpendicular to the first roller conveyor according to claim 5, wherein the glass-engaging surfaces of the lifting arms are covered with a scratch-reducing material.

* * * * *